United States Patent [19]
Odagiri

[11] Patent Number: 5,172,008
[45] Date of Patent: Dec. 15, 1992

[54] MULTI-WAY SEQUENTIAL POWER-ON CIRCUIT

[75] Inventor: Hiroyuki Odagiri, Yokohama, Japan

[73] Assignee: Fujitsu Ltd., Kawasaki, Japan

[21] Appl. No.: 554,364

[22] Filed: Jul. 19, 1990

[30] Foreign Application Priority Data

Jul. 20, 1989 [JP] Japan .................................. 1-188153

[51] Int. Cl.$^5$ .............................................. H02J 1/00
[52] U.S. Cl. ......................................... 307/41; 307/38
[58] Field of Search ............................ 361/166-169.1; 307/41, 38-40, 80

[56] References Cited

U.S. PATENT DOCUMENTS

| | | | |
|---|---|---|---|
| 4,092,570 | 5/1978 | Nakamoto | 318/102 |
| 4,100,426 | 7/1978 | Baranowski et al. | 307/41 |
| 4,695,738 | 9/1987 | Wilmot | 307/31 |

Primary Examiner—A. D. Pellinen
Assistant Examiner—Aditya Krishnan
Attorney, Agent, or Firm—Staas & Halsey

[57] ABSTRACT

In a power system having a plurality of power units which are supplied with an external power source and output a power source required for a load, multi-way sequential power-on operation is carried out by enabling two power units, designating as masters beforehand, to be turned on immediately when the external power source is turned on. The master, when turned on, transmits a start signal to two other power units, commanding the addressed power unit to be turned on. The addressed power unit, on receipt of a start signal from any of two other power units, turns on and transmits a start signal to two other power units, and thus propagating start signals on two routes beginning with two masters to sequentially turn on power units by twos at a time.

10 Claims, 4 Drawing Sheets

MULTI-WAY SEQUENTIAL POWER-ON CIRCUIT

BACKGROUND OF THE INVENTION

1. Field of the Invention

The present invention relates to a circuit for sequentially turning on a plurality of power units which supply power to respective devices such as central processing unit and magnetic tape unit.

Such a system as consists of a plurality of devices, each of which has a respective power unit, is being adopted in recent years. Therefore, an economical and reliable power system of this type is increasingly being demanded.

2. Description of the Related Art

In the above-mentioned power system, if all the power units are turned on at a time, a rush (or surge) current 10 to 20 times as large as the steady-state current flows, damaging external power source circuit or requiring as large current capacity as the rush current of the external power source. Therefore, a method to sequentially turn on the power units as shown in FIG. 1 and in Laid Opened Japanese Patent TOKUKAISHO 59-123425 (1984) is being used.

FIG. 1 is a block diagram illustrating a sequential power-on method of the related art of the present invention.

Power unit 1a is placed first in line and followed by power units 2a to 5a, the order in which power is turned on. External power source is connected in common to terminals L1-L2. Power units 1a to 5a each have power supply circuit 12 for supplying power to the devices (not depicted via terminals T1-T2. Power supply circuit 12 of power unit 1a is directly connected to terminals L1-L2, and those of power units 2a to 5a are connected thereto via, for example, relay contacts which are closed by a start signal from the preceding power unit of the line. The start signal, which commands that the succeeding power unit be turned on, is activated when a power supply circuit is turned on.

When turned on, the external power source is input directly to power supply circuit 12 of power unit 1a, which supplies power to the device and outputs a start signal to power unit 2a via terminal D1.

In power source unit 2a, the start signal received at terminal A1 closes the contacts to input the external power supply to power source circuit 12. Thus, power unit 2a is turned on and a start signal is output to power unit 3a.

In a similar manner, subsequent power units 3a to 5a are turned on in sequence.

However, a problem is that in case the start signal is not propagated to the next power unit due to a failure in any of the power units, all the subsequent power units cannot be turned on, disabling the system.

SUMMARY OF THE INVENTION

In a power system having a plurality of power units which are supplied with an external power source and output a power source required for a load, an object of the present invention is to provide an economical and fail-soft power system; and therefore, another object of the present invention is to provide a circuit for sequentially turning on all the normal power units even with a failure in any of the power units which conventionally prevented turning on not only the power unit in failure but also other normal power units.

Above objects are accomplished by providing a power unit with a switching circuit, 2 or more start signal transmit circuits, 2 or more start signal receive circuits and a turn-on circuit.

The switching circuit selectively enables any of the power units, designating as a master beforehand, to be turned on when the external power source is turned on.

The start signal transmit circuit transmits a start signal when the power unit is turned on, commanding other power units to be turned on.

The start signal receive circuit receives a start signal from another power unit.

The turn-on circuit turns on the power unit when any of the start signal receive circuits receives a start signal.

Thus, by connecting the start signal transmit circuits to the start signal receive circuits mutually among the power units to propagate the start signals on 2 or more routes beginning with at least one master, power units can be sequentially turned on by a unit of 2 or more (or even one by one) on 2 or more routes, allowing all the normal power units to be turned on securely even with a failure in any of the power units.

BRIEF DESCRIPTION OF THE DRAWINGS

FIG. 4 shows currents vs. the number of power units turned on; and

Throughout the above-mentioned drawings, identical reference numerals are used to designate the same or similar component parts.

DESCRIPTION OF THE PREFERRED EMBODIMENTS

Figure 1:
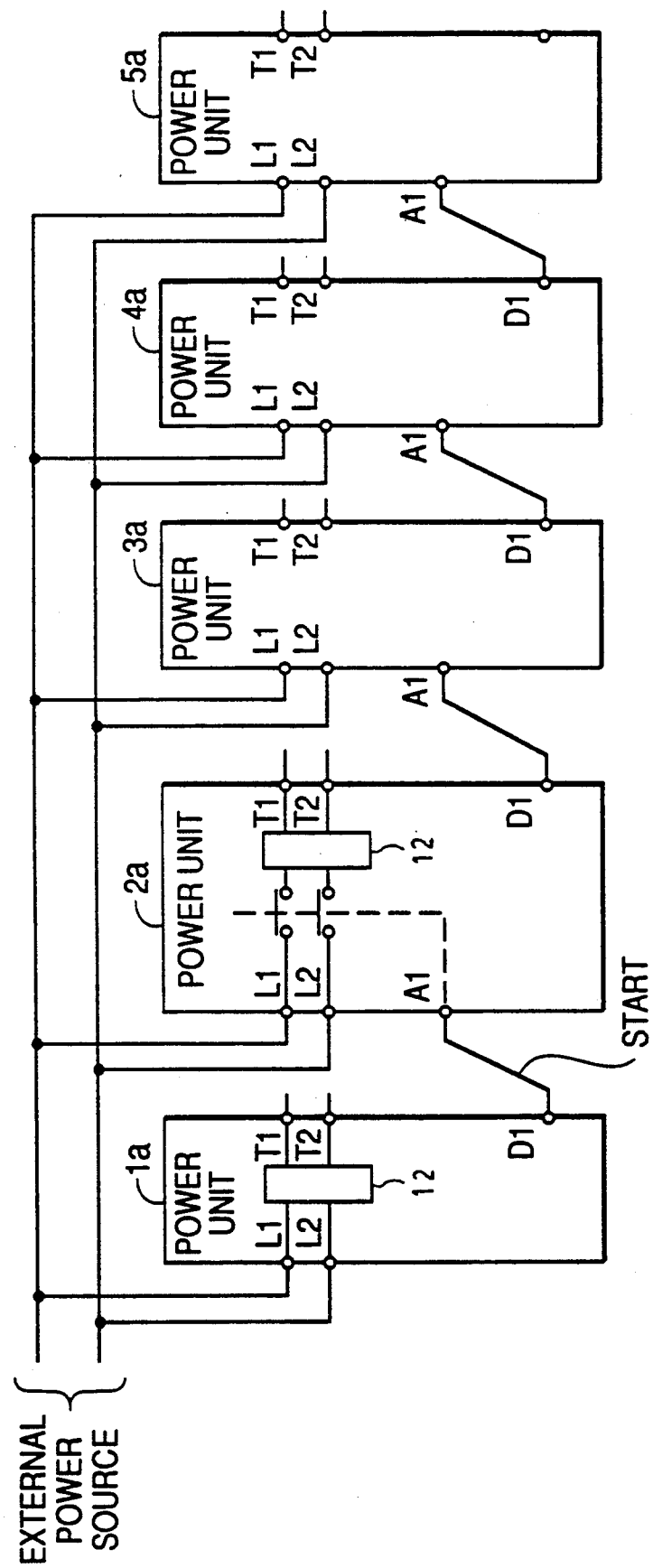
FIG. 1 is a block diagram illustrating a sequential power-on method of the related art of the present invention.
Figure 2:
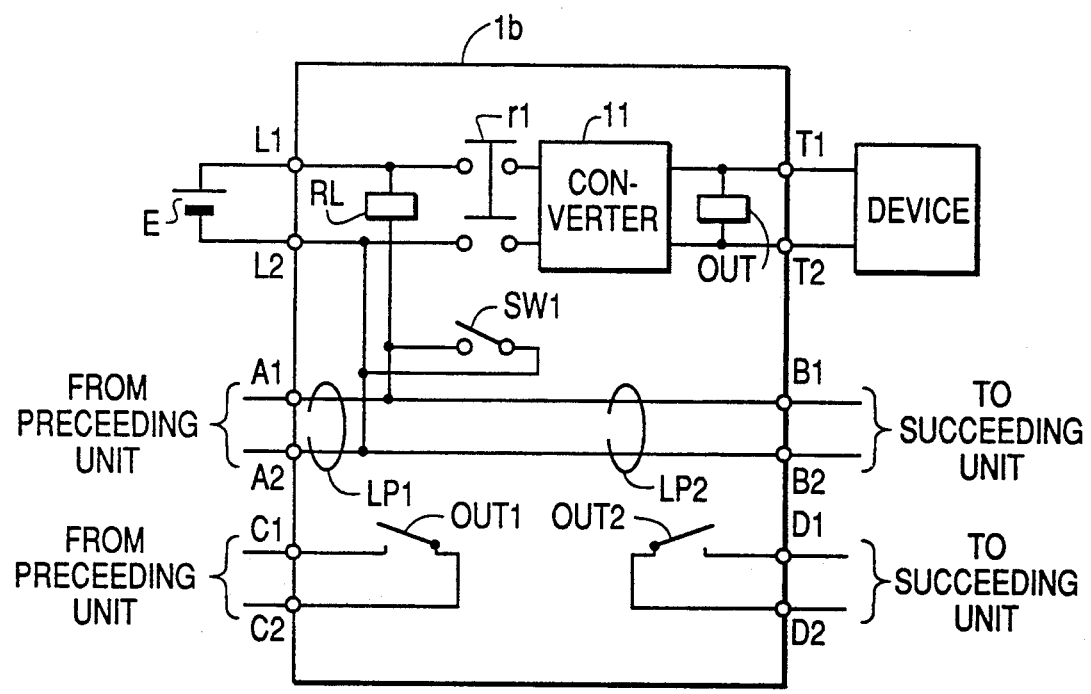
FIG. 2 shows a 2-way sequential power-on circuit embodying the present invention.

FIG. 2 shows a 2-way sequential power-on circuit embodying the present invention, which is employed in a dc-to-dc converter-type power unit.

External (dc-current) power source E is input to dc-to-dc converter 11 via terminals L1-L2 and relay contacts r1. Converter 11, which consists of an inverter followed by a step-up or step-down transformer and rectifier (not depicted), converts the power source E to a stabilized power to supply to a device such as a central processing unit and magnetic tape unit.

Start signal receive circuits LP1 and LP2 receive a start signal (which is a closed-contact signal commanding the power unit to be turned on) from the preceding and succeeding power units via terminals A1-A2 and B1-B2, respectively. When either or both of start signal receive circuits LP1 and LP2 receive a start signal, relay (coil) RL is energized and its contact r1 is closed to input external power source E to converter 11. When converter 11 outputs a stabilized power, relay OUT, which serves as a start signal transmit circuit, is energized and its contacts out1 and out2 are closed to output a start signal to the preceding and succeeding power units via terminals C1-C2 and D1-D2, respectively.

Switch SW1, when closed beforehand, selectively designates the power unit to be a master. A master is the first of the power units connected in a daisy-chain connection to be sequentially turned on. In a master, when external power source E is turned on, relay RL is energized immediately because switch SW1 is closed beforehand and external power source E is input to converter 11 through contacts r1. When supplied with a stabilized power, relay OUT is energized, closing contacts out1 and out2, i.e., outputting start signals to the preceding and succeeding power units via terminals C1–C2 and D1–D2, respectively.

Figure 3:
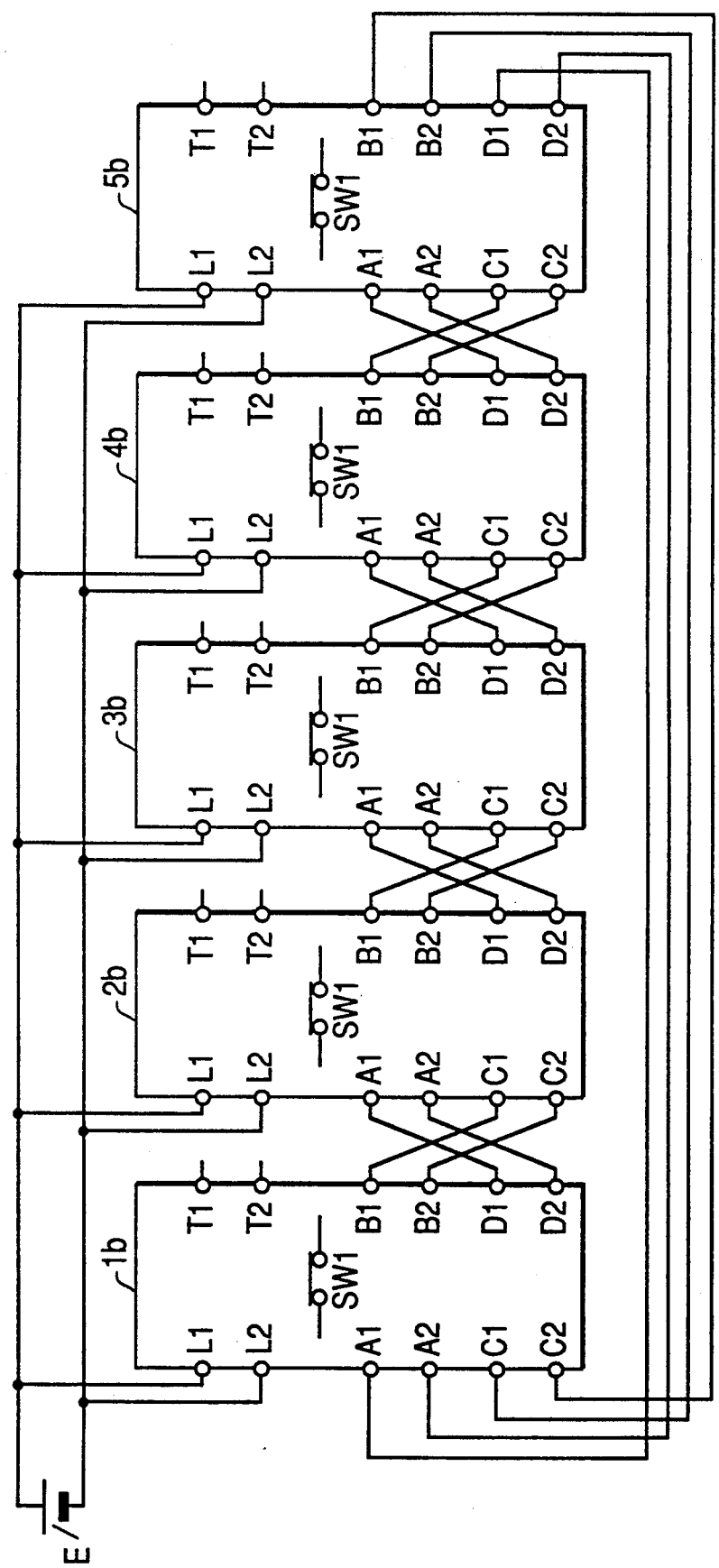
FIG. 3 is a block diagram illustrating a 2-way sequential power-on method of the present invention.

FIG. 3 is a block diagram illustrating 2-way sequential power-on method of the present invention.

Power units 1b to 5b each consists of the circuit shown in FIG. 2.

Power units 1b to 5b are designated to be masters by closing respective switch SW1 beforehand.

When external power source E is turned on, converters 11 of master power units 1b and 5b are turned on, energizing relays OUT, respectively.

Closed contacts out1 and out2 of relay OUT of master power unit 1b transmit a start signal to power units 5b and 2b, respectively. Upon receipt of the start signal, power unit 2b is turned on in a similar manner to power unit 1b and transmits a start signal to power unit 3b. Hereupon, although power unit 5b receives a start signal from power unit 1b, it has no effect on power unit 5b because power unit 5b is already turned on.

Closed contacts out1 and out2 of relay OUT of master power unit 5b transmit a start signal to power units 4b and 1b, respectively. Upon receipt of the start signal, power unit 4b is turned on and transmits a start signal to power unit 3b to turn on power unit 3b. Hereupon, too, although power unit 1b receives a start signal from power unit 5b. it has no effect on power unit 5b because power unit 1b is already turned on.

Thus, by designating two power units (or even one) as a master, the power-on sequence proceeds on two separate routes, turning on all the normal units by twos.

Since the power-on sequence proceeds on two separate routes sequentially, the number of power units turned on at a time is two at most.

Figure 4:
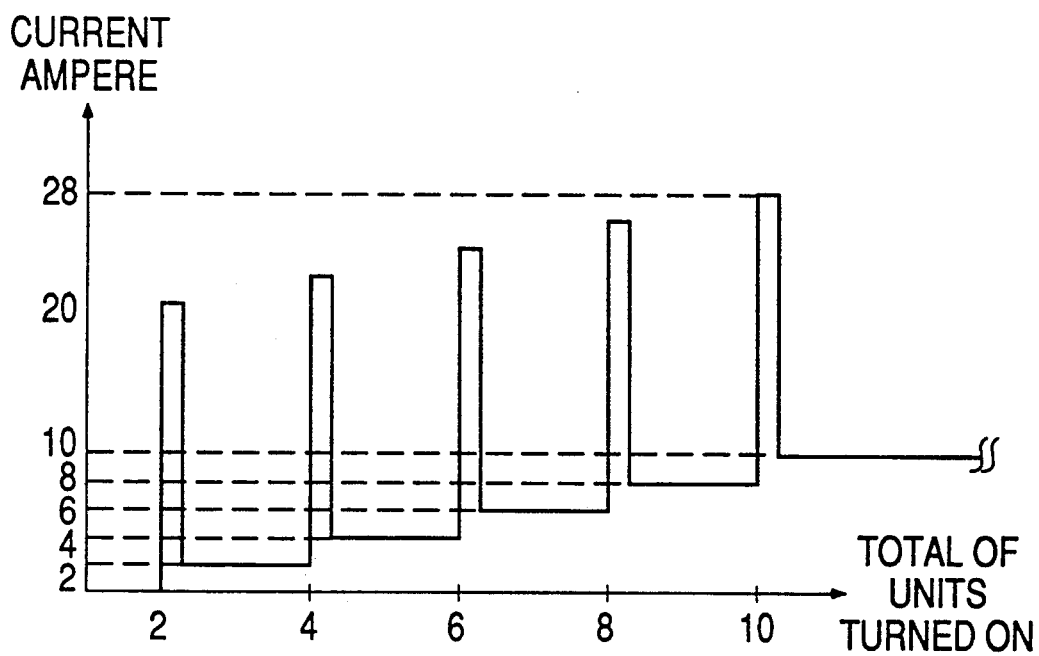

FIG. 4 shows an example of a power system in which power units are sequentially turned on by twos out of ten and a rush current is assumed to be 10 times that of the steady-state current. In this example, a current capacity of 28 amperes is required for external power source E, compared with 100 amperes in the case 10 units are turned on at the same time.

Figure 5:
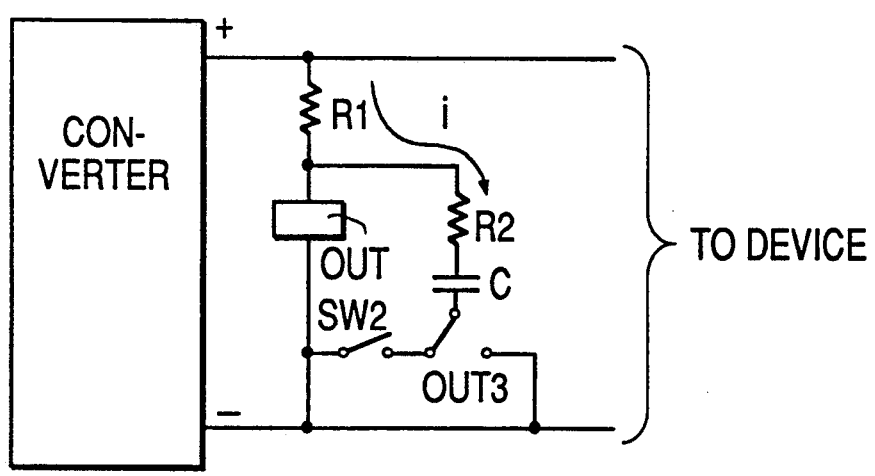
FIG. 5 shows a circuit that allows power units to be turned on one by one alternately on two routes.

In the above examples, the number of units turned on at a time can be reduced to one by providing the two masters with relays OUT having different operation time to make start signals propagate alternately. This can be realized by using a circuit shown in FIG. 5 for relay OUT. In FIG. 5, the operation time of relay OUT can be changed by closing or opening switch SW2. When switch SW 2 is opened, relay OUT is energized immediately and, when closed, it is energized after a time interval in which current i flowing through resistors R1 and R2 charges capacitor C to a voltage level that enables relay OUT to operate.

In another example, too, where only one master is designated as a master and the power-on sequence starts with the only one master, the power units can be turned on one by one alternately on the two routes by using in the master two circuits as shown in FIG. 5 which differ in operation time and by transmitting the start signals via their respective contacts to the preceding and succeeding units, respectively.

Furthermore, according to the present invention, a power system can be so constructed that a power-on sequence starts with more than two masters on more than two routes by closing SW1 in as many units and/or providing as many relay contacts for transmitting a start signal.

Thus, in a system having a plurality of power units each supplying power to respective system components, the present invention allows all the normal power units to be sequentially turned on even with a failure in any of the power units, realizing an economical and fail-soft power system.

What is claimed is:

1. A multi-way sequential power-on circuit, operatively connectable to an external power source, for energizing a plurality of power units, comprising:
   switching means for selecting among the plurality of the power units a master power unit and for energizing the master power unit when the external power source is energized;
   transmitting means for transmitting a start signal from the master power unit to remaining power units when the master power unit is energized to command the remaining power units to be energized;
   receiving means in the remaining power units for receiving the start signal; and
   energizing means for propagating the start signal along a bidirectional route beginning with the master power unit and in response to said receiving means receiving the start signal, to sequentially energize the remaining power units.

2. A multi-way sequential power-on circuit according to claim 1, wherein said transmitting means comprises:
   two output lines;
   a relay operatively connected between the two output lines and wherein:
   said relay includes a contact to transmit a start signal.

3. A multi-way sequential power-on circuit according to claim 1, wherein the external power source includes two input lines; and
   wherein said energizing means comprises:
   a relay contact operatively connected in series with one of the input lines; and
   a relay coil operatively connected between the two input lines.

4. A multi-way sequential power-on circuit according to claim 3, wherein said receiving means comprises:
   a line operatively connected in series between said relay coil and one of the input lines.

5. A multi-way sequential power-on circuit according to claim 3, wherein said switching means comprises:
   a switch operatively connected between said relay coil and one of the input lines.

6. A multi-way sequential power-on circuit according to claim 1, wherein the external power source includes one input line; and wherein said switching means comprises
   a switch operatively connected in series with the input line.

7. A multi-way sequential power-on circuit according to claim 1, wherein said transmitting means of said master power unit includes means for selectively varying an interval between a time when said master unit is energized and a time when the start signal is transmitted to the remaining power units.

8. A multi-way sequential power-on circuit according to claim 7, wherein each of the plurality of the power units includes two output lines, and wherein said transmitting means comprises:
   a relay;
   a resistor operatively connected between one of the output lines and the relay; and
   a capacitor operatively connected between the two output lines so that the interval varies according to said resistor and said capacitor and wherein: said relay includes a contact to transmit the start signal.

9. A multi-way sequential power-on circuit according to claim 1, wherein said transmitting means of the plurality of the power units includes means for selectively varying an interval between a time when one of the plurality of the power units is energized and a time when the start signal is transmitted to the remaining power units.

10. A multi-way sequential power-on circuit according to claim 8, wherein each of the plurality o the power units includes two output lines, and
   wherein said transmitting means comprises:
      a relay;
      a resistor operatively connected between one of the output lines and the relay; and
      a capacitor operatively connected between the two output lines so that the interval varies according to said resistor and said capacitor and wherein: said relay includes a contact to transmit the start signal.

* * * * *

UNITED STATES PATENT AND TRADEMARK OFFICE
CERTIFICATE OF CORRECTION

PATENT NO. : 5,172,008
DATED : December 15, 1992
INVENTOR(S) : Hiroyuki Odagiri

It is certified that error appears in the above-identified patent and that said Letters Patent is hereby corrected as shown below:

Col. 1, line 34, after "depicted" insert --)--.

Col. 6, line 4, "o" should be --of--.

Signed and Sealed this

Thirtieth Day of November, 1993

Attest:

BRUCE LEHMAN

Attesting Officer

Commissioner of Patents and Trademarks